(12) United States Patent
Eichmann et al.

(10) Patent No.: US 7,942,638 B2
(45) Date of Patent: May 17, 2011

(54) TURBOMACHINE BLADE WITH A BLADE TIP ARMOR CLADDING

(75) Inventors: Wolfgang Eichmann, Puchheim (DE); Karl-Heinz Manier, Scheyern (DE); Thomas Uihlein, Dachau (DE); Markus Uecker, Munich (DE); Falko Heutling, Munich (DE)

(73) Assignee: MTU Aero Engines GmbH, Munich (DE)

( * ) Notice: Subject to any disclaimer, the term of this patent is extended or adjusted under 35 U.S.C. 154(b) by 1266 days.

(21) Appl. No.: 11/472,626

(22) Filed: Jun. 21, 2006

(65) Prior Publication Data

US 2010/0226782 A1   Sep. 9, 2010

(30) Foreign Application Priority Data

Jun. 29, 2005   (DE) .................. 10 2005 030 266

(51) Int. Cl.
*F01D 5/28* (2006.01)

(52) U.S. Cl. ............ 416/229 A; 416/241 R; 416/241 B; 415/173.1; 428/610; 428/623; 428/627; 428/660; 428/666; 428/670

(58) Field of Classification Search .............. 415/173.1, 415/173.4, 173.5; 416/229 A, 241 R, 241 B; 428/623, 660, 610, 627, 666, 670
See application file for complete search history.

(56) References Cited

U.S. PATENT DOCUMENTS

| | | | |
|---|---|---|---|
| 4,481,237 A | 11/1984 | Bosshart et al. | |
| 4,528,079 A | 7/1985 | Badger | |
| 4,562,090 A | 12/1985 | Dickson et al. | |
| 4,761,346 A | 8/1988 | Naik | |
| 5,059,095 A | 10/1991 | Kushner et al. | |
| 5,169,674 A | 12/1992 | Miller | |
| RE34,173 E | 2/1993 | Kerber | |
| 5,437,933 A | 8/1995 | Coupland et al. | |
| 5,516,586 A | 5/1996 | Singer et al. | |
| 5,547,767 A | 8/1996 | Paidassi et al. | |
| 6,214,475 B1 | 4/2001 | Bamberg et al. | |
| 6,780,458 B2 | 8/2004 | Seth et al. | |
| 7,160,635 B2 * | 1/2007 | Leyens et al. | 428/698 |
| 7,186,092 B2 * | 3/2007 | Bruce et al. | 416/241 R |
| 2002/0076573 A1 | 6/2002 | Neal et al. | |
| 2002/0102400 A1 | 8/2002 | Gorokhovsky et al. | |
| 2004/0022949 A1 | 2/2004 | Hasezaki et al. | |
| 2004/0072038 A1 | 4/2004 | Henderer | |
| 2004/0115471 A1 * | 6/2004 | Nagaraj et al. | 428/660 |
| 2006/0040129 A1 * | 2/2006 | Darolia et al. | 428/650 |
| 2007/0190351 A1 * | 8/2007 | Eichmann et al. | 428/622 |
| 2008/0124469 A1 | 5/2008 | Eichmann et al. | |

FOREIGN PATENT DOCUMENTS

DE    42 29 600    11/1993

(Continued)

*Primary Examiner* — Christopher Verdier
(74) *Attorney, Agent, or Firm* — W. F. Fasse; W. G. Fasse

(57) ABSTRACT

A blade of a turbomachine such as a gas turbine includes a blade vane with a blade tip and a blade base. A blade tip armor cladding is applied on the blade tip. A coating covers at least the armor cladding and includes at least one multilayer coating system, and preferably plural such coating systems stacked repetitively on one another. Each coating system includes at least two different layers stacked successively on one another, with one layer of a metal material closer to the blade tip and one layer of a ceramic material farther from the blade tip.

24 Claims, 1 Drawing Sheet

FOREIGN PATENT DOCUMENTS

| | | |
|---|---|---|
| DE | 93 21 489 | 8/1998 |
| DE | 10 2004 050 474 A1 * | 4/2006 |
| EP | 0 366 298 | 5/1990 |
| EP | 0 471 505 | 2/1992 |
| EP | 0 679 733 | 11/1995 |
| EP | 0 713 972 | 5/1996 |
| EP | 0 919 699 | 6/1999 |
| EP | 1 338 670 | 8/2003 |
| EP | 1 382 709 | 1/2004 |
| GB | 826 057 | 12/1959 |
| GB | 2 397 307 | 7/2004 |
| JP | 11-343565 | 12/1999 |
| WO | WO 01/32799 | 5/2001 |
| WO | WO-2005/066384 A1 * | 7/2005 |
| WO | WO 2006/042506 | 4/2006 |

* cited by examiner

TURBOMACHINE BLADE WITH A BLADE TIP ARMOR CLADDING

PRIORITY CLAIM

This application is based on and claims the priority under 35 U.S.C. §119 of German Patent Application 10 2005 030 266.1, filed on Jun. 29, 2005, the entire disclosure of which is incorporated herein by reference.

FIELD OF THE INVENTION

The invention relates to a blade of a turbomachine such as a gas turbine, whereby the blade has an armor cladding on the blade tip.

BACKGROUND INFORMATION

Turbomachines, such as gas turbines for example, typically comprise several stages of rotating rotor blades as well as stationary guide vanes. The rotor blades rotate together with a rotor. The rotor blades as well as the guide vanes are enclosed by a stationary housing of the gas turbine. In order to increase the output power and/or the efficiency of the gas turbine, it is important to optimize all components and sub-systems thereof, including the so-called seal systems. In a gas turbine aircraft engine, it is especially problematic to maintain a minimal gap between the rotating rotor blades and the stationary housing of a high pressure compressor of the engine, and also between the stationary guide vanes and a rotating rotor shaft of the high pressure compressor. Namely, the greatest temperatures and temperature gradients arise in the high pressure compressors, which makes it more difficult to maintain the appropriate minimum clearance gap. This also arises because so-called cover bands, as they are used in turbines, are not provided for compressor rotor blades and compressor guide vanes.

Because the guide vanes and the rotor blades in the compressor are not provided with a cover band, the ends or tips of the rotating rotor blades are subjected to a direct frictional contact with the housing during the so-called grazing of the blade tips along or into the surface of the stationary housing. Similarly, the free ends or tips of the guide vanes are subjected to a direct frictional contact with the adjacent surface of the rotor shaft. Such a grazing of the blade tips with the adjacent stationary components is caused, in connection with the setting of a minimal radial gap, due to production tolerances. During operation of the turbomachine, due to the frictional contact of the blade tips, material is abraded and removed from the blade tips, which leads to the formation of an increased gap size around the entire circumference of the housing and the rotor.

In order to avoid the above described enlargement of the gap, it is known in the prior art to provide a blade tip armor coating or cladding on the blade tips. The conventionally known armor claddings can be formed of hard material particles or abrasive particles. However, such a blade tip armor cladding is also subject to wear during operation of the turbomachine, and can also be damaged in this regard.

SUMMARY OF THE INVENTION

In view of the above, it is an object of the invention to provide a blade of a turbomachine, for example a gas turbine, wherein the blade tip is provided with an armor cladding and further features so that the blade is less subject to wear. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a turbomachine blade having a blade body including a blade vane terminating at a blade tip, a blade tip armor cladding provided on the blade tip, and a coating provided on or covering at least the blade tip armor cladding. The coating comprises at least one multilayer coating system that comprises at least two different layers stacked successively on one another, namely a proximal layer comprising a metallic material arranged facing or closer to the blade tip armor cladding and a distal layer comprising a ceramic material arranged relatively farther from the blade tip armor cladding. Preferably, the turbomachine blade includes a plurality of the multilayer coating systems arranged repetitively or stacked one on top of another. For example, two of such multilayer coating systems can be stacked successively on the blade tip armor cladding.

According to a preferred embodiment, each multilayer coating system comprises at least four different layers including a first layer arranged closest (among the four layers) to the blade tip armor cladding, a second layer arranged on the first layer, a third layer arranged on the second layer, and a fourth layer arranged on the third layer. The term "arranged (or disposed) on" means arranged (or disposed) directly or indirectly (i.e. with one or more additional intervening layers) on the preceding layer. These four layers in this arrangement can be provided in the individual multilayer coating system, or respectively the same in each one of the plural multilayer coating systems. The first layer comprises or is formed of a metal material. The second layer comprises or is formed of a metal alloy material. The third layer comprises or is formed of a graded metal-ceramic material (i.e. a mixture or composite of metal and ceramic with a gradient of metal-ceramic composition through the thickness of the layer). The fourth layer comprises or is formed of a ceramic material. Preferably, at least all of the layers comprising ceramic are nano-structured, i.e. have nano-scale structure as can be achieved with a nano-technology layer deposition or formation process.

The blade tip armor cladding is protected against wear by coating the blade tip armor cladding with at least one of the above described multilayer coating systems. The total layer thickness of the layers of a single multilayer coating system, or respectively of each one of plural multilayer coating systems, is less than 100 μm. Thus, the overall coating of the blade tip armor cladding is very thin. Furthermore, the achieved surface quality is very smooth, so that no negative aerodynamic influences arise. The seal effect and the durability of the blade tip armor cladding is thereby significantly improved relative to the prior art.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
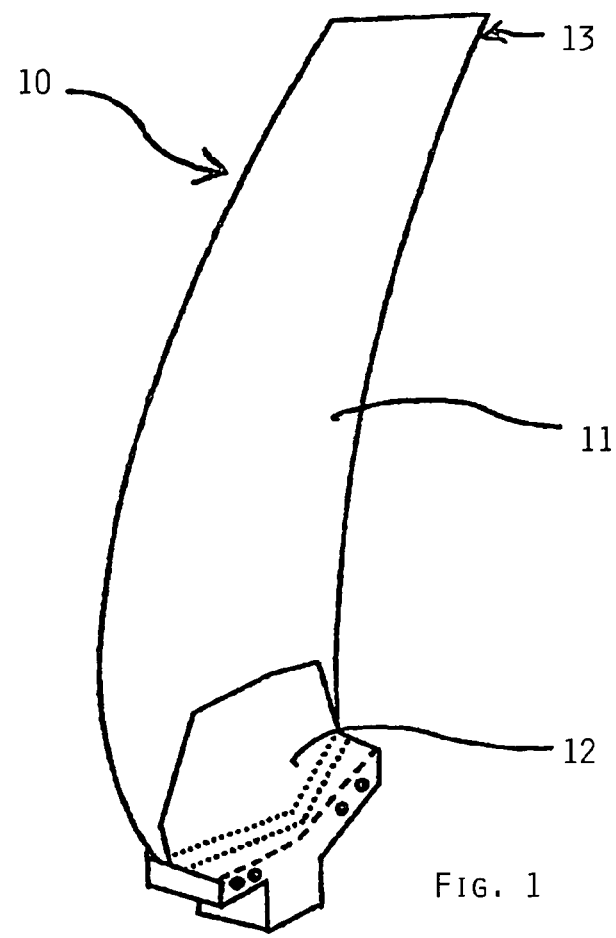
FIG. 1 is a schematic perspective view of a turbomachine blade according to an embodiment of the invention.
Figure 2:
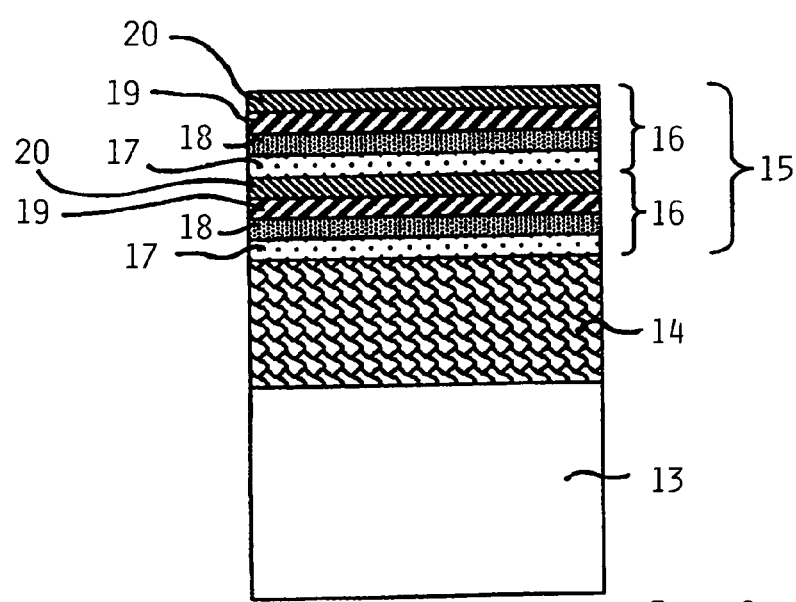
FIG. 2 is an enlarged schematic cross-section through the blade tip of the turbomachine blade according to FIG. 1.

FIG. 1 schematically illustrates a rotor blade 10 of a gas turbine aircraft engine. The rotor blade 10 comprises a blade body including a blade vane 11, a blade root, pedestal or base 12 at a radially inner end of the blade vane 11, and a so-called blade tip 13 formed at a radially outer end of the blade vane 11. In order to protect the blade tip 13 against wear caused by so-called grazing contact thereof against a stationary housing or a seal component of the housing, the blade tip 13 is provided with a blade tip armor cladding 14. This armor cladding 14 can have any conventionally known or future developed composition, arrangement and provision on the blade tip 13. For example, according to the prior art, this armor cladding 14 can be formed of hard material particles or abrasive particles, and it may further include any suitable matrix if necessary.

Further according to the present invention, the blade tip armor cladding 14 is additionally covered or coated with a coating 15 that comprises at least one multilayer coating system 16. Preferably, as illustrated in the present embodiment, the coating comprises plural multilayer coating systems 16 applied repetitively in sequence in a stacked or layered manner one on top of another. Particularly in the illustrated example embodiment, the coating 15 of the blade tip armor cladding 14 consists of two such multilayer coating systems 16 stacked successively on one another on the armor cladding 14.

Each one of the multilayer coating systems 16 comprises at least two different layers. In the illustrated preferred example embodiment, each multilayer coating system 16 comprises or preferably consists of four different layers. A first layer 17 oriented toward or closest to the blade tip armor cladding 14, in each multilayer coating system 16, is formed of (e.g. comprises or consists of) a metal material. A second layer 18 applied on the first layer 17 in each multilayer coating system 16 is formed of a metal alloy material. A third layer 19 applied on the second layer 18 in each multilayer coating system 16 is formed of a graded metal-ceramic material. A fourth layer 20 applied on the third layer 19 in each multilayer coating system 16 is formed of a ceramic material. The graded metal-ceramic material within the layer 19 forms a gradient transition between the second layer 18 and the fourth layer 20, namely a gradient transition of the composition between the metal alloy of the second layer 18 and the ceramic material of the fourth layer 20. The particular concrete selection of materials and properties of the individual layers 17, 18, 19 and 20 of each respective multilayer coating system 16 is adapted to the material composition of the rotor blade 10 and/or armor cladding 14 that is to be coated, and/or the operating requirements of the particular application.

A particular example embodiment is as follows. For a rotor blade 10 formed of a nickel-based material, the first layer 17 is preferably embodied as a nickel (Ni) layer. The second layer 18 is preferably a nickel-chromium (NiCr) layer applied onto the first Ni layer 17. The third layer 19 is preferably a graded metal-ceramic layer preferably formed of a $CrN_{(1-x)}$ material ($CrN_{(1-x)}$ layer) applied on the second NiCr layer 18. The designation 1–x represents the gradient of composition through the thickness of the layer, where x indicates the fractional or proportional distance from the side of the third layer 19 facing the fourth layer 20, toward the side of the third layer 19 facing the second layer 18. The fourth layer 20 is formed of a ceramic material, namely chromium nitride, as a CrN layer 20. At least all of the layers comprising ceramic, i.e. at least the third layer 19 and the fourth layer 20, are nano-structured. Furthermore, all of the layers 17, 18, 19 and 20 can each be nano-structured. This can be achieved by any conventionally known or future developed nano-technology layer deposition or formation process.

As a further example, for a rotor blade 10 formed of a titanium-based material, the first layer 17 is preferably formed of titanium, palladium, or platinum. In this regard, the second layer 18 applied onto the first layer 17 is preferably formed of a TiCrAl material or a CuAlCr material. The third layer 19 arranged on the second layer is again a gradient layer, which is either formed of a graded $CrAlN_{(1-x)}$ material or a graded $TiAlN_{(1-x)}$ material. In the former case in which the layer 19 is formed of a $CrAlN_{(1-x)}$ material, the fourth layer 20 is then a ceramic layer formed as a CrAlN layer. In the above latter case in which the third layer 19 is formed of the $TiAlN_{(1-x)}$ material, then the fourth layer 20 is preferably formed of titanium aluminum nitride (TiAlN). Instead of such a titanium aluminum nitride material, the fourth layer 20 in this case can alternatively be made of a TiAlSiN material, or AlTiN material, or TiN\AlN material as the respective suitable ceramic material.

The coating 15 including the one or more multilayer coating systems 16 is applied onto the blade tip armor cladding 14 by means of a physical vapor deposition (PVD) coating process. It is conventionally known how to apply successive layers with different compositions and with graded compositions by such a PVD process. The layer thickness of a multilayer coating system 16 preferably amounts to less than 100 μm. It is also possible to apply the coating 15 not only on the blade tip armor cladding 14, but additionally over the area of the entire blade vane 11 of the blade body of the rotor blade 10.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A turbomachine blade comprising:
a blade body including a blade vane and a blade tip at one end of said blade vane;
an armor cladding disposed on at least said blade tip of said blade body; and
a coating disposed on at least said armor cladding on said blade tip of said blade body;
wherein said coating comprises at least one multilayer coating system, and each said multilayer coating system respectively comprises at least four different layers that are stacked successively on one another and that include a first layer arranged closest to said armor cladding, a second layer arranged on said first layer, a third layer arranged on said second layer, and a fourth layer arranged farthest from said armor cladding on said third layer, and
wherein said first layer comprises a metal material, said second layer comprises a metal alloy material, said third layer comprises a graded metal-ceramic material, and said fourth layer comprises a ceramic material.

2. The turbomachine blade according to claim 1, wherein said first layer is disposed directly on said armor cladding.

3. The turbomachine blade according to claim 1, wherein said first layer consists of said metal material, and said fourth layer consists of said ceramic material.

4. The turbomachine blade according to claim 1, wherein said at least one multilayer coating system comprises a plurality of multilayer coating systems stacked successively on one another.

5. The turbomachine blade according to claim 4, wherein each one of said multilayer coating systems respectively comprises the same said layers stacked successively on one another in the same layer arrangement in each one of said multilayer coating systems.

6. The turbomachine blade according to claim 4, wherein said plurality of multilayer coating systems includes exactly two of said multilayer coating systems stacked on one another.

7. The turbomachine blade according to claim 1, wherein said coating is further disposed on said blade vane of said blade body.

8. The turbomachine blade according to claim 7, wherein said coating entirely covers said blade body and said armor cladding.

9. The turbomachine blade according to claim 1, wherein said first layer consists of said metal material, said second layer consists of said metal alloy material, said third layer consists of said graded metal-ceramic material, and said fourth layer consists of said ceramic layer.

10. The turbomachine blade according to claim 1, wherein, in one said multilayer coating system, said first layer is disposed directly on said armor cladding, said second layer is disposed directly on said first layer, said third layer is disposed directly on said second layer, and said fourth layer is disposed directly on said third layer.

11. The turbomachine blade according to claim 1, wherein said blade body comprises a nickel-based material, and said metal material of said first layer is a nickel material.

12. The turbomachine blade according to claim 11, wherein said metal alloy material of said second layer is a nickel alloy material.

13. The turbomachine blade according to claim 12, wherein said nickel alloy material is a NiCr alloy material.

14. The turbomachine blade according to claim 11, wherein said graded metal-ceramic material of said third layer is a $CrN_{(1-x)}$ material.

15. The turbomachine blade according to claim 11, wherein said ceramic material of said fourth layer is a CrN material.

16. The turbomachine blade according to claim 1, wherein said blade body comprises a titanium-based material, and said metal material of said first layer is a material selected from the group consisting of titanium materials, platinum materials or palladium materials.

17. The turbomachine blade according to claim 16, wherein said metal alloy material of said second layer is a titanium alloy material or an aluminum alloy material.

18. The turbomachine blade according to claim 16, wherein said metal alloy material of said second layer is a TiCrAl material or a CuAlCr material.

19. The turbomachine blade according to claim 16, wherein said graded metal-ceramic material of said third layer is a $CrAlN_{(1-x)}$ material or a $TiAlN_{(1-x)}$ material.

20. The turbomachine blade according to claim 16, wherein said ceramic material of said fourth layer is a material selected from the group consisting of CrAlN materials, TiAlN materials, TiAlSiN materials or TiN/AlN materials.

21. The turbomachine blade according to claim 1, wherein at least each one of said layers comprising a ceramic has a nano-structure.

22. The turbomachine blade according to claim 1, wherein each one of said layers has a nano-structure.

23. The turbomachine blade according to claim 1, wherein all of said layers of each respective one said multilayer coating system together have a total layer thickness of less than 100 µm.

24. A turbomachine blade comprising:
a blade body including a blade vane and a blade tip at one end of said blade vane;
an armor cladding disposed on at least said blade tip of said blade body; and
a coating disposed on at least said armor cladding on said blade tip of said blade body;
wherein said coating comprises a plurality of multilayer coating systems stacked successively on one another, and each one of said multilayer coating systems respectively comprises four different layers stacked successively on one another, including a first layer arranged closest to said armor cladding and comprising a metal material, a second layer arranged on said first layer and comprising a metal alloy material, a third layer arranged on said second layer and comprising a graded metal-ceramic material, and a fourth layer arranged on said third layer and comprising a ceramic material.

* * * * *